US010837372B2

(12) United States Patent
Asai

(10) Patent No.: US 10,837,372 B2
(45) Date of Patent: Nov. 17, 2020

(54) CONTROL DEVICE FOR INTERNAL COMBUSTION ENGINE AND CONTROL METHOD FOR INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/316,566

(22) PCT Filed: Jun. 29, 2017

(86) PCT No.: PCT/JP2017/024050
§ 371 (c)(1),
(2) Date: Jan. 9, 2019

(87) PCT Pub. No.: WO2018/012310
PCT Pub. Date: Jan. 18, 2018

(65) Prior Publication Data
US 2019/0153965 A1    May 23, 2019

(30) Foreign Application Priority Data

Jul. 14, 2016  (JP) .................................. 2016-139577

(51) Int. Cl.
*F02D 19/02* (2006.01)
*F02M 21/02* (2006.01)
(Continued)

(52) U.S. Cl.
CPC ......... *F02D 19/02* (2013.01); *F02D 19/0642* (2013.01); *F02D 19/0671* (2013.01);
(Continued)

(58) Field of Classification Search
CPC ...... F02D 19/02; F02D 19/10; F02D 19/0676; F02D 19/0642; F02D 19/08;
(Continued)

(56) References Cited

U.S. PATENT DOCUMENTS

2011/0132286 A1   6/2011   Leone et al.
2011/0253072 A1  10/2011   Leone et al.

FOREIGN PATENT DOCUMENTS

GB   2485363 A  *  5/2012   .............. F01N 3/28
JP   5946358 A     3/1984
(Continued)

OTHER PUBLICATIONS

European Search Report dated Jun. 14, 2019 issued in corresponding EP Application 17827440.3.
(Continued)

*Primary Examiner* — Jacob M Amick
*Assistant Examiner* — Charles Brauch
(74) *Attorney, Agent, or Firm* — Norton Rose Fulbright US LLP

(57) ABSTRACT

An internal combustion engine in which when an ECU receives an engine stop command by an ON-operation of an engine stop switch, a supply of fuel from an injector to a fuel reformation chamber is stopped while a supply of fuel from an injector to a combustion chamber is continued, and the residual amount of a reformed fuel in passages is estimated, in this state. When the estimated residual amount reaches a predetermined amount or zero, the fuel supply from the injector to the combustion chamber is stopped, and an internal combustion engine is stopped.

19 Claims, 6 Drawing Sheets

(51) Int. Cl.
    *F02M 25/00*     (2006.01)
    *F02D 19/08*     (2006.01)
    *F02D 19/06*     (2006.01)
    *F02D 19/10*     (2006.01)
    *F02D 41/00*     (2006.01)
    *F02M 27/02*     (2006.01)
    *F02M 25/022*     (2006.01)
    *F02M 25/025*     (2006.01)

(52) U.S. Cl.
    CPC ......... *F02D 19/0676* (2013.01); *F02D 19/08* (2013.01); *F02D 19/10* (2013.01); *F02D 41/0027* (2013.01); *F02M 21/02* (2013.01); *F02M 25/00* (2013.01); *F02M 27/02* (2013.01); *F02D 19/087* (2013.01); *F02M 25/025* (2013.01); *F02M 25/0227* (2013.01); *Y02T 10/32* (2013.01)

(58) Field of Classification Search
    CPC ............. F02D 41/0027; F02D 19/0671; F02D 19/087; F02D 41/0025; F02M 25/00; F02M 27/02; F02M 21/02; F02M 25/025; F02M 25/0227; Y02T 10/32
    See application file for complete search history.

(56) References Cited

FOREIGN PATENT DOCUMENTS

| | | | |
|---|---|---|---|
| JP | 8-291774 | A | 11/1996 |
| JP | 2004-284835 | A | 10/2004 |
| JP | 2006-052662 | A | 2/2006 |
| JP | 2006052662 | A * | 2/2006 |
| JP | 2006249981 | A | 9/2006 |
| JP | 2008-121548 | A | 5/2008 |
| JP | 2009097425 | A | 5/2009 |
| JP | 2013-170535 | A | 9/2013 |
| JP | 2014-136978 | A | 7/2014 |
| JP | 2015218644 | A * | 12/2015 |
| JP | 2015218644 | A | 12/2015 |

OTHER PUBLICATIONS

International Search Report dated Sep. 26, 2017 issued in corresponding PCT Application PCT/JP2017/024050.
Japanese Office Action dated Sep. 3, 2019 issued in corresponding JP Application 2016-139577.
Korean Office Action dated Aug. 13, 2019 issued in corresponding KR 10-2018-7030415.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024050, filed on Jun. 29, 2017 which claims priority under 35 U.S.C. § 119 to Japanese Patent Application No. 2016-139577 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method to be applied to an internal combustion engine including a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

When the operation of this type of internal combustion engine is stopped, generation of reformed fuel in the fuel reformation cylinder and driving of the output cylinder are stopped at the same time. In other words, supply of the fuel (fuel for generating the reformed fuel) to the fuel reformation cylinder and supply of the fuel (fuel for the diesel micro pilot ignition) to the output cylinder are stopped at the same time.

However, when the operation of the internal combustion engine is stopped in this way, the reformed fuel remains in the reformed fuel supply path between the fuel reformation cylinder and the output cylinder thereafter.

To date, the treatment of the reformed fuel (hereinafter referred to as "residual reformed fuel") remaining in the reformed fuel supply path has not particularly considered. Therefore, the residual reformed fuel is discharged from the system into the atmosphere at an unintended timing. Further, due to the influence of the residual reformed fuel, the gas composition in the output cylinder at the subsequent early start-up stage may significantly deviate from the proper state. To improve the reliability of the system, it is desirable to have this residual reformed fuel properly processed.

Such a problem may take place not only in an internal combustion engine which generate reformed fuel by a fuel reformation cylinder, but also in an internal combustion engine which generates reformed fuel with a use of a fuel reforming catalyst. Hereinafter, the fuel reformation cylinder and the fuel reforming catalyst will be collectively referred to as a fuel reformation device.

The present invention is made in view of the above problems, and it is an object of the present invention to provide a control device and a control method for an internal combustion engine having a fuel reformation device and an output cylinder, the control device and the control method capable of suitably processing residual reformed fuel in a reformed fuel supply path between the fuel reformation device and the output cylinder.

Solution to Problem

A solution of the present invention to achieve the above-described object premises a control device to be applied to an internal combustion engine including a fuel reformation device capable of generating reformed fuel through a fuel reforming operation and an output cylinder to which the reformed fuel generated in the fuel reformation device is supplied through a reformed fuel supply path, the output cylinder configured to yield an engine power by combusting the reformed fuel. Such a control device for the internal combustion engine includes: a reformed fuel processing unit configured to execute a reformed fuel processing operation, upon receiving an engine stop command or after the engine is stopped, for drawing out and processing the reformed fuel from the reformed fuel supply path until a residual amount of reformed fuel in the reformed fuel supply path is a predetermined amount or less.

With this, upon receiving an engine stop command or after the engine is stopped, the reformed fuel processing unit executes the reformed fuel processing operation for drawing out and processing the reformed fuel from the reformed fuel supply path. This reformed fuel processing operation is executed until the residual amount of the reformed fuel in the reformed fuel supply path is a predetermined amount or less. Therefore, the reformed fuel will not remain in the reformed fuel supply path, or the residual amount of the reformed fuel in the reformed fuel supply path will be significantly reduced. As a result, the residual reformed fuel is kept from being discharged from the system into the atmosphere at an unintended timing. Further, the gas composition in the output cylinder at a subsequent early start-up stage of the internal combustion engine is suppressed or reduced from being greatly deviated from a suitable state.

Further, it is preferable that, when the engine stop command is received, the reformed fuel processing operation introduces the reformed fuel in the reformed fuel supply path into the output cylinder and combusts the reformed fuel in the output cylinder.

With this, the reformed fuel in the reformed fuel supply path will be processed in the form of combustion in the output cylinder, and the reformed fuel will not be discharged from the system into the atmosphere.

Further, in the internal combustion engine, an exhaust path is provided in which the reformed fuel in the reformed fuel supply path flows while bypassing the output cylinder, an oxidation catalyst is provided to the exhaust path, and an alarm unit configured to issue an alarm is provided. The reformed fuel processing operation may introduce the reformed fuel in the reformed fuel supply path into the exhaust path after the engine is stopped, and when the gas temperature thereof is equal to or higher than a predetermined temperature, the reformed fuel may be oxidized and detoxified by the oxidation catalyst and then discharged into atmosphere, and an alarm may be issued by the alarm unit.

With this, when the gas temperature is equal to or higher than a predetermined value (equal to or higher than a lower limit value of an active temperature range of the oxidation catalyst), the non-combusted fuel (reformed fuel) can be oxidized and removed. Further, by issuing an alarm by the alarm unit, it is possible to alert the worker and the like.

Further, the internal combustion engine includes a residual amount estimator configured to estimate a residual amount of the reformed fuel in the reformed fuel supply path, based on the concentration of a reformed fuel component in the reformed fuel supply path or based on the temperature and pressure in the reformed fuel supply path. Preferably, the reformed fuel processing unit is configured to execute the reformed fuel processing operation until the residual amount of the reformed fuel estimated by the residual amount estimator is equal to or less than a predetermined amount.

With this, the residual amount of the reformed fuel can be accurately estimated by sensing the state quantity of the gas in the reformed fuel supply path. Therefore, a suitable period for executing the reformed fuel processing operation can be obtained.

Further, the internal combustion engine includes a residual amount estimator configured to estimate a residual amount of reformed fuel in the reformed fuel supply path by subtracting an integrated value of an amount of the reformed fuel combusted in the output cylinder, from an integrated value of an amount of the reformed fuel generated in the fuel reformation device from the start of the fuel reforming operation. In this case, the reformed fuel processing unit may be configured to execute the reformed fuel processing operation until the residual amount of the reformed fuel estimated by the residual amount estimator is equal to or less than a predetermined amount.

Thus, it is possible to accurately estimate the residual amount of the reformed fuel in the reformed fuel supply path, and to obtain a suitable period for executing the reformed fuel processing operation.

Further, the fuel reformation device is structured by a reciprocation type fuel reformation cylinder in which a piston reciprocates in the cylinder. In this case, when the engine stop command is received, the reformed fuel processing unit executes the reformed fuel processing operation to stop fuel supply to the fuel reformation cylinder, and continue fuel supply to the output cylinder to continue driving of the output cylinder. Further, the reformed fuel processing operation may be executed until a fuel supply amount to the output cylinder for continuing driving of the output cylinder reaches a predetermined amount.

With this, the amount of fuel supplied to the output cylinder to continue driving the output cylinder is increased with a decrease in the concentration of the reformed fuel in the gas introduced to the output cylinder due to a decrease in the residual amount of the reformed fuel in the reformed fuel supply path, and due to the continued reformed fuel processing operation. That is, by observing the fuel supply amount to the output cylinder, the residual amount of the reformed fuel can be estimated. Therefore, when the fuel supply amount to the output cylinder reaches the predetermined amount, the residual amount of the reformed fuel is an amount that can allow stopping of the internal combustion engine. The internal combustion engine is stopped at this timing. By observing the fuel supply amount to the output cylinder, the end timing of the reformed fuel processing operation can be suitably determined, and the control can be simplified.

Preferably, the exhaust path is provided with an open/close valve capable of being opened/closed, and the open/close valve is closed in the fuel reforming operation and opened in the reformed fuel processing operation.

With this, a situation where the reformed fuel is partially discharged without being supplied to the output cylinder can be avoided by closing the open/close valve during the fuel reforming operation, and the fuel consumption rate can be improved.

Further, the exhaust path may be provided with an exhaust unit configured to cause the reformed fuel in the reformed fuel supply path while bypassing the output cylinder and forcedly exhaust the reformed fuel into the atmosphere through the oxidation catalyst.

With this, the reformed fuel in the reformed fuel supply path can be discharged into the atmosphere in a short time, and the time required for the reformed fuel processing operation can be shortened.

Further, the scope of the technical thought of the present invention encompasses a control method for the internal combustion engine implemented by the control device for the internal combustion engine according to each of the above described solutions. Namely, it is premised a control method is applied to an internal combustion engine including a fuel reformation device capable of generating reformed fuel through a fuel reforming operation and an output cylinder to which the reformed fuel generated in the fuel reformation device is supplied through a reformed fuel supply path, the output cylinder configured to yield an engine power by combusting the reformed fuel. In such a control method for the internal combustion engine, a reformed fuel processing operation is executed, upon receiving an engine stop command or after the engine is stopped, for drawing out and processing the reformed fuel from the reformed fuel supply path until a residual amount of reformed fuel in the reformed fuel supply path is a predetermined amount or less.

Also with this control method, the residual reformed fuel is kept from being discharged from the system into the atmosphere at an unintended timing. Further, the gas composition in the output cylinder at a subsequent early start-up stage of the internal combustion engine is suppressed or reduced from being greatly deviated from a suitable state.

Advantageous Effects of Invention

In the present invention, a reformed fuel processing operation is executed, upon receiving an engine stop command or after the engine is stopped, for drawing out and processing the reformed fuel from the reformed fuel supply path until a residual amount of reformed fuel in the reformed fuel supply path is a predetermined amount or less. Therefore, the reformed fuel can be kept from being discharged from the system into the atmosphere at an unintended timing. Further, the gas composition in the output cylinder at a subsequent early start-up stage of the internal combustion engine can be suppressed or reduced from being greatly deviated from a suitable state.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
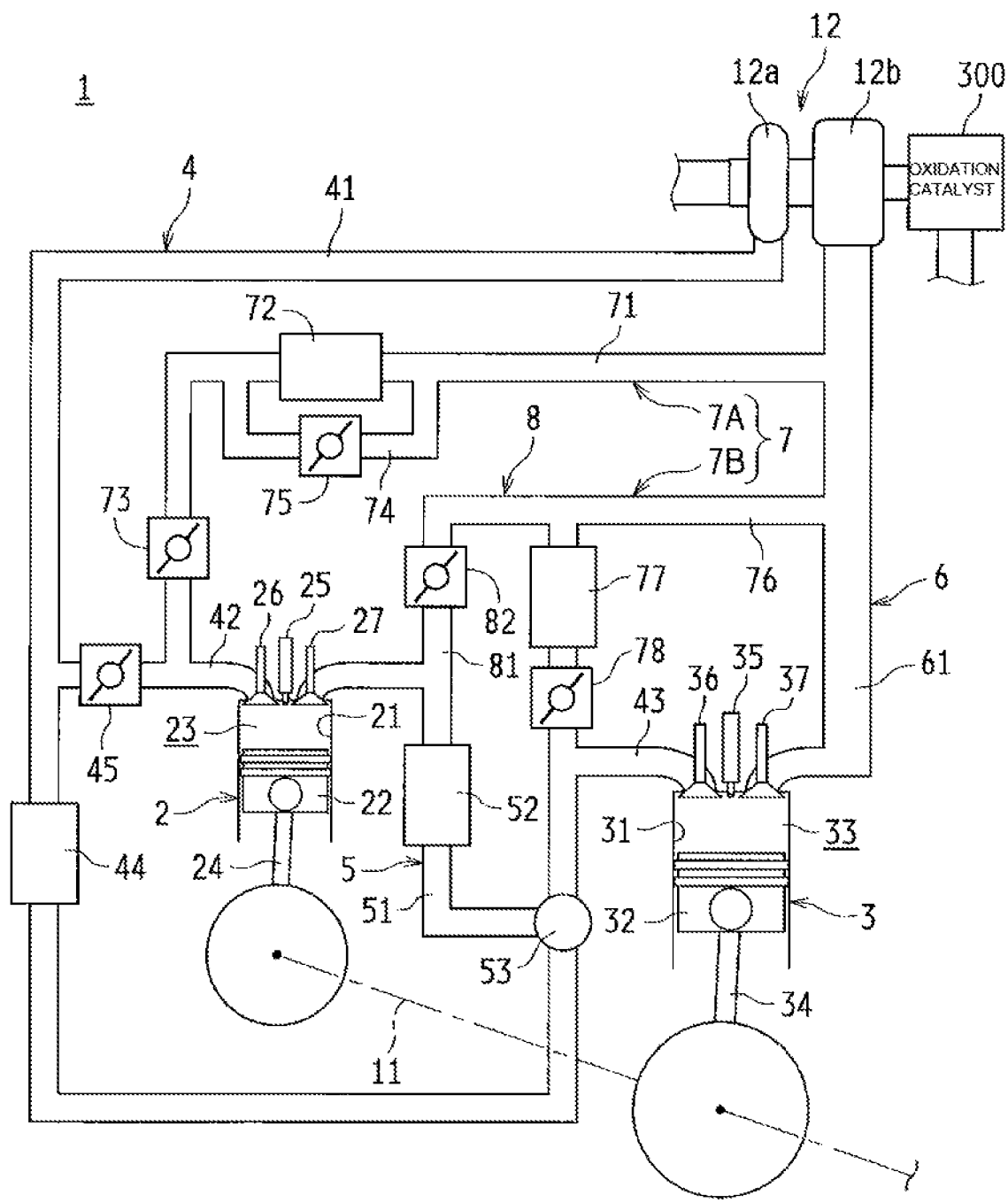
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 serving as a fuel reformation device of the present invention and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture is performed in the combustion chamber 33. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12b of the turbocharger 12. The exhaust passage 61 communicates with an exhaust port of the output cylinder 3. Between this exhaust port and the combustion chamber 33 of the output cylinder 3, an exhaust valve 37 that can open/close is arranged. Further, an oxidation catalyst 300 is arranged on the downstream side of the turbine wheel 12b of the turbocharger 12. If the temperature of the gas flowing through the exhaust passage 61 is equal to or higher than a predetermined value (not lower than the lower limit value of the active temperature range of the oxidation catalyst 300), the non-combusted fuel can be oxidized or removed.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76. The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
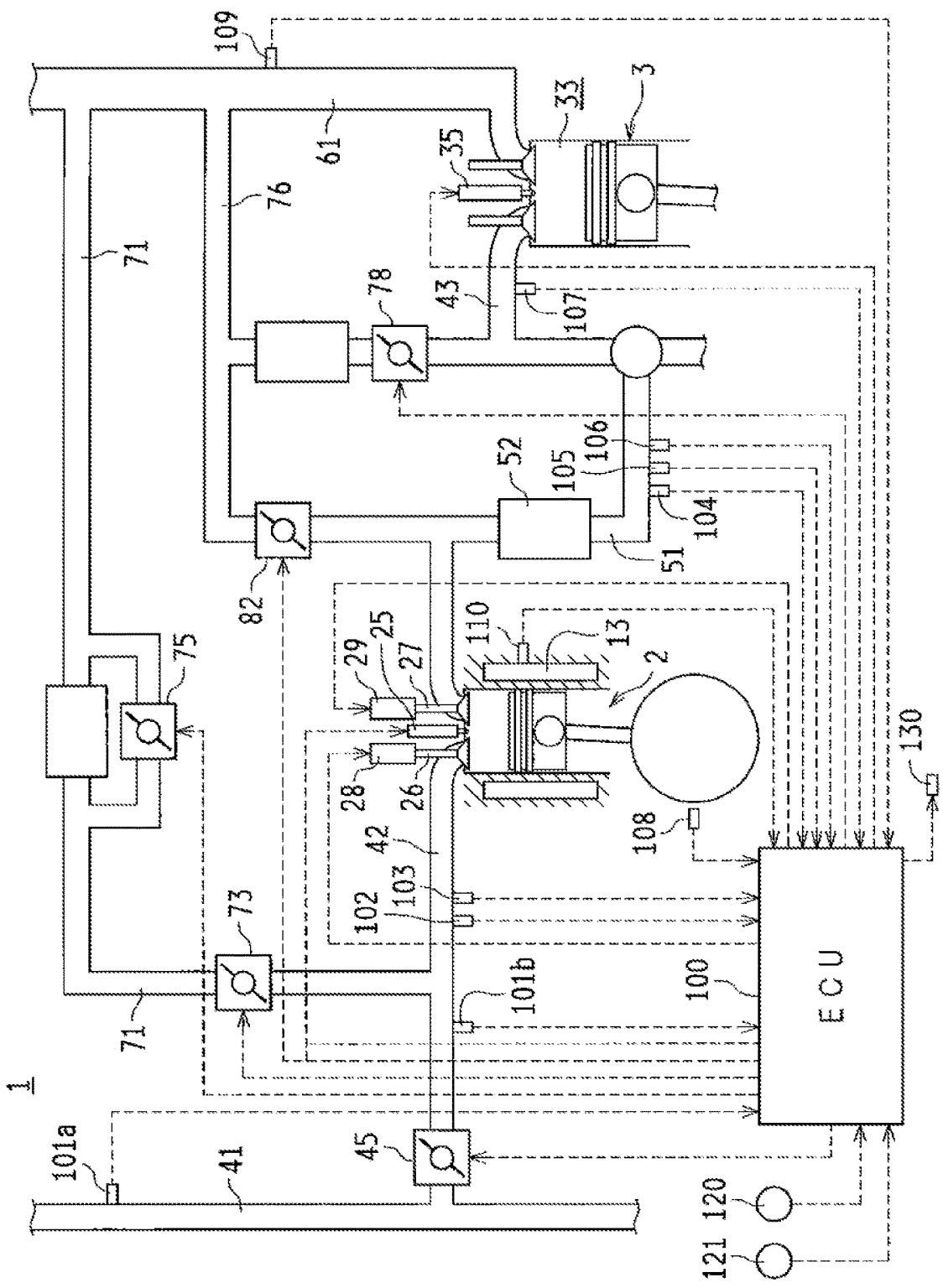
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes intake-air flow sensors 101a, 101b, a taken-in gas pressure sensor 102, a taken-in gas temperature sensor 103, a reformed gas concentration sensor 104, a reformed gas pressure sensor 105, a reformed gas temperature sensor 106, an air-fuel mixture pressure sensor 107, a crank position sensor 108, an exhaust pressure sensor 109, a water temperature sensor 110, and the like.

The intake-air flow sensor 101a transmits, to the ECU 100, an output signal corresponding to the flow rate of the taken-in air (air) flowing in the main air-intake passage 41.

The intake-air flow sensor 101b transmits, to the ECU 100, an output signal corresponding to the flow rate of the taken-in gas flowing in the fuel reformation cylinder air-intake passage 42.

The taken-in gas pressure sensor 102 transmits, to the ECU 100, an output signal corresponding to the pressure of the taken-in gas flowing in the fuel reformation cylinder air-intake passage 42. Specifically, an output signal corresponding to the pressure of the taken-in gas in the fuel reformation cylinder air-intake passage 42, on the downstream side of a portion communicating with the fuel reformation cylinder EGR passage 71 is transmitted to the ECU 100.

The taken-in gas temperature sensor 103 transmits, to the ECU 100, an output signal corresponding to the temperature of the taken-in gas flowing in the fuel reformation cylinder air-intake passage 42. Specifically, an output signal corresponding to the taken-in gas temperature of the fuel reformation cylinder air-intake passage 42, on the downstream side of a portion communicating with the fuel reformation cylinder EGR passage 71 is transmitted to the ECU 100.

The reformed gas concentration sensor 104 transmits, to the ECU 100, an output signal corresponding to the concentration of the reformed fuel (reformed gas) flowing in the reformed fuel supply passage 51. Specifically, an output signal corresponding to the reformed gas concentration on the downstream side of the reformed fuel cooler 52 in the reformed fuel supply passage 51 is transmitted to the ECU 100.

The reformed gas pressure sensor 105 transmits, to the ECU 100, an output signal corresponding to the pressure of the reformed fuel (reformed gas) flowing in the reformed fuel supply passage 51. Specifically, an output signal corresponding to the reformed gas pressure on the downstream side of the reformed fuel cooler 52 in the reformed fuel supply passage 51 is transmitted to the ECU 100.

The reformed gas temperature sensor 106 transmits, to the ECU 100, an output signal corresponding to the temperature of the reformed fuel (reformed gas) flowing in the reformed fuel supply passage 51. Specifically, an output signal corresponding to the reformed gas temperature on the downstream side of the reformed fuel cooler 52 in the reformed fuel supply passage 51 is transmitted to the ECU 100.

The air-fuel mixture pressure sensor 107 transmits, to the ECU 100, an output signal corresponding to the pressure of the air-fuel mixture introduced to the combustion chamber 33. Specifically, the air-fuel mixture pressure sensor 107 transmits, to the ECU 100, an output signal corresponding to the pressure of the exhaust gas on the downstream side of a portion of the output cylinder air-intake passage 43 communicating with the output cylinder EGR passage 76.

The crank position sensor 108 is constituted by, for example, an electromagnetic pickup, and outputs, to the ECU 100, a pulse signal corresponding to a rotation position of a not-shown Ne rotor arranged so as to be integrally rotatable with the crankshaft 11 or a not-shown flywheel.

The exhaust pressure sensor 109 transmits, to the ECU 100, an output signal corresponding to the pressure of the exhaust gas flowing in the exhaust passage 61. Specifically, the exhaust pressure sensor 109 transmits, to the ECU 100, an output signal corresponding to the pressure of the exhaust gas at upstream side of a portion of the exhaust passage 61 communicating with the output cylinder EGR passage 76.

The water temperature sensor 110 transmits, to the ECU 100, an output signal corresponding to the temperature of the cooling water flowing in the cooling water passage 13 formed in the cylinder block. Specifically, an output signal corresponding to the temperature of the cooling water flowing in the cooling water passage 13 formed around the fuel reformation cylinder 2 is transmitted to the ECU 100.

Further, the ECU 100 is electrically connected to an engine stop switch 120 and an emergency stop switch 121. The engine stop switch 120 is ON-operated by a worker at an occasion of normal engine stop. With the ON-operation of the engine stop switch 120, an engine stop command signal is transmitted to the ECU 100. Further, the emergency stop switch 121 is ON-operated by a worker in case of system error or the like. With the ON-operation of the emergency stop switch 121, an emergency stop command signal is transmitted to the ECU 100.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Further, the ECU 100 is connected to an alarm device (alarm unit of the present invention) 130. This alarm device 130 indicates an alarm on an operator monitor of the system or alarm by sound, when the internal combustion engine 1 is urgently stopped (when the emergency stop switch 121 is ON-operated by the worker, or when the ECU 100 executes an automatic emergency stop) and the like.

Based on the output signals from the above described various sensors 101a to 110, the command signals from the switches 120, 121, and the like, the ECU 100 performs: fuel injection control (opening and closing control of the injectors 25, 35) of the injectors 25, 35; opening and closing control of the adjustment valves 45, 73, 75, 78, 82 (gas flow rate control), opening and closing timing control of the valves 26, 27 by variable valve units 28, 29, and an alarming operation by the alarm device 130.

—Basic Operation of Internal Combustion Engine—

Next, a basic operation of the internal combustion engine 1 configured as described above will be described.

In a basic operation after completion of warming up the internal combustion engine 1 (in a state enabling a reforming reaction of the fuel in the fuel reformation chamber 23), the air introduced into the main air-intake passage 41 is pressurized by the compressor wheel 12a of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lower limit value of a reforming reaction enabling temperature, according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft.

Also, a part of the engine power is used as a drive source for the reciprocating movement of the piston 22 in the fuel reformation cylinder 2.

Further, at a time of cold start of the internal combustion engine 1, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Through the above, compressed ignition combustion (usually, combustion equivalent to diesel combustion) takes place in each of the fuel reformation chamber 23 of the fuel reformation cylinder 2 and the combustion chamber 33 of the output cylinder 3. Then, when the warm-up of the fuel reformation cylinder 2 proceeds and the temperature reaches a temperature that enables the reforming reaction, the operation is switched to an operation for generating the reformed fuel (fuel reforming operation). As described above, the fuel reformation cylinder 2 can function as a cylinder for obtaining an engine power as in the case of the output cylinder 3, and can function as a fuel reformation device as hereinabove described.

With this internal combustion engine 1, combustion (uniform lean combustion) of the lean mixture is performed in the output cylinder 3. The NOx emission amount and the soot discharge amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
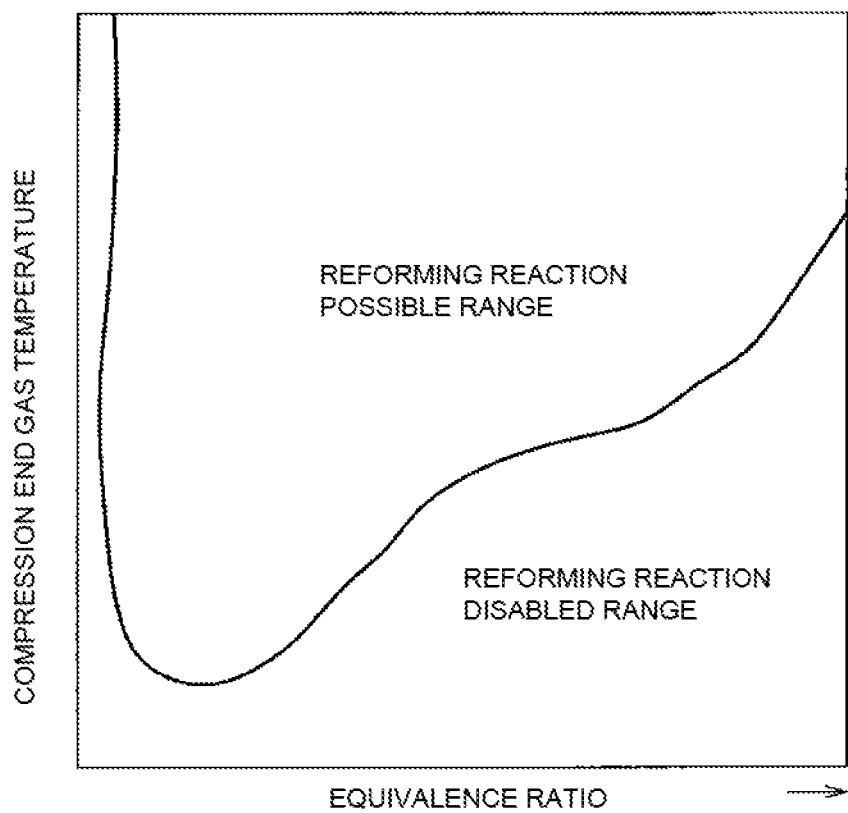
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming reaction in the fuel reformation chamber 23, an equivalent ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Internal Combustion Engine Stopping Control—

Next, the following describes an internal combustion engine stopping control, which is a characteristic of the present embodiment. As described above, in an occasion of stopping the internal combustion engine 1, if generation of reformed fuel in the fuel reformation cylinder 2 and driving of the output cylinder 3 are stopped at the same time, reformed fuel may remain in the reformed fuel supply passage 51, or in a space of the output cylinder air-intake passage 43, on the downstream side of the mixer 53. In such a case, the residual reformed fuel may be discharged from the system into the atmosphere at an unintended timing. Further, due to the influence of the residual reformed fuel, the gas composition in the combustion chamber 33 at the subsequent early start-up stage may significantly deviate from the proper state (e.g., a state in which the equivalence ratio is less than 1). To improve the reliability of the system, it is desirable to have this residual reformed fuel properly processed.

In view of this, in the present embodiment, a reformed fuel processing operation is executed which, upon the ECU 100 receiving an engine stop command (upon reception of the engine stop command signal by ON-operation of the engine stop switch 120) or after the engine is stopped (e.g., after the internal combustion engine 1 is urgently stopped by an ON-operation and the like of the emergency stop switch 121), for drawing out and processing the reformed fuel from the reformed fuel supply passage 51 or the output cylinder air-intake passage 43 (reformed fuel supply path of the present invention), until a residual amount of reformed fuel in these passages 51, 43 is a predetermined amount or less.

The reformed fuel processing operation is executed by the ECU 100. Therefore, the functional part of the ECU 100 that executes this reformed fuel processing operation corresponds to the reformed fuel processing unit described in the present invention.

An example of the reformed fuel processing operation is an operation in which the reformed fuel in the reformed fuel supply passage 51 or in the output cylinder air-intake passage 43 is introduced into the combustion chamber 33, when the ECU 100 receives an engine stop command by ON-operation of the engine stop switch 120, and combusting this reformed fuel in the combustion chamber 33 (hereinafter, reformed fuel combustion process).

Another example of the reformed fuel processing operation is an operation in which, after the engine is stopped (e.g., after an emergency stop of the internal combustion engine 1), the reformed fuel in the reformed fuel supply passage 51 and the output cylinder air-intake passage 43 is introduced to the oxidation catalyst 300 through the output cylinder bypass passage 81, the output cylinder EGR passage 76, and the exhaust passage 61 (these passages correspond to the exhaust path of the present invention), mixed with the fresh air to oxidize and remove the reformed gas. Meanwhile, there is also an alarming operation by the alarm device 130 (hereinafter, reformed fuel discharging operation). In the present invention, the oxidation catalyst 300 is not essential, and in the case of the internal combustion engine 1 in which the oxidation catalyst 300 is not mounted, the reformed gas is discharged into the atmosphere through the exhaust passage 61.

The following sequentially describes the above mentioned reformed fuel processing operations. In the following, a case of performing the reformed fuel combustion process is described as a first embodiment, and a case of performing the reformed fuel discharging operation is described as a second embodiment.

First Embodiment (Reformed Fuel Combustion Process)

When the ECU 100 receives an engine stop command by an ON-operation of the engine stop switch 120, the reformed fuel combustion process stops supply of fuel from the injector 25 to the fuel reformation chamber 23 while continuing supply of fuel from the injector 35 to the combustion chamber 33, and estimates the residual amount of the reformed fuel in the passages 51, 43, in this state. When the combustion (treatment) of the reformed fuel in the combustion chamber 33 proceeds, and when the estimated value of the residual amount of reformed fuel drops to a predetermined amount or zero, the fuel supply from the injector 35 to the combustion chamber 33 is stopped, and the internal combustion engine 1 is stopped.

As a method of estimating the residual amount of the reformed fuel in the passages 51, 43, there are a first estimation method to a fifth estimation method as described below. The residual amount of the reformed fuel in the passages 51, 43 is estimated by any of these methods, and the internal combustion engine 1 is stopped at a point when the estimated residual amount of the reformed fuel drops to a predetermined amount or less, or when the residual amount of the reformed fuel reaches zero.

The following describes each of the estimation methods.

(First Estimation Method)

The first estimation method estimates the amount of hydrogen ($H_2$) and carbon monoxide (CO) which are each a gas component unique to the reformed fuel (reformed gas).

Specifically, based on an output signal or the like from the reformed gas concentration sensor 104, the amount of hydrogen and the amount of carbon monoxide in the gas (the gas containing the reformed fuel) in the passages 51, 43 are estimated. This estimating operation is estimation of "a residual amount of the reformed fuel in the reformed fuel supply path, based on the concentration of a reformed fuel component in the reformed fuel supply path" of the present invention. The estimating operation is executed by the ECU 100. Therefore, the functional part of the ECU 100 that executes this estimating operation corresponds to the residual amount estimator described in the present invention.

The fuel supply from the injector 35 to the combustion chamber 33 is continued, and the driving of the output cylinder 3 is continued, until the amount of hydrogen and the amount of carbon monoxide are reduced to a predetermined amount. That is, when the amount of hydrogen and the amount of carbon monoxide in the gas in the passages 51, 43 are reduced to the predetermined amount, the supply of fuel from the injector 35 to the combustion chamber 33 is stopped, and the internal combustion engine 1 is stopped.

The proportion of hydrogen and carbon monoxide in the reformed fuel will vary depending on the equivalence ratio and the compression end gas temperature in the fuel reformation chamber 23. In other words, the proportion of hydrogen and carbon monoxide in the reformed fuel drawn into the passages 51, 43 vary depending on the equivalence ratio and the compression end gas temperature in the fuel reformation chamber 23 when the reformed fuel is generated. Further, the total amounts of hydrogen and carbon monoxide in the reformed fuel vary depending on the reformed gas concentration. In view of this, the relationship between the equivalence ratio and the compression end gas temperature in the fuel reformation chamber 23, and the reformed gas concentration and the amounts of hydrogen and carbon monoxide in the reformed fuel is mapped based on an experiment or a simulation, and this map is stored in the ROM. Based on the output signals from the sensors and the injection command value for the injector 25, the equivalence ratio and the compression end gas temperature in the fuel reformation chamber 23 before stopping fuel supply to the fuel reformation chamber 23, and the reformed gas concentration in the passages 51, 43 are applied to the map to obtain the amounts of hydrogen and carbon monoxide in the passages 51, 43.

(Second Estimation Method)

The second estimation method estimates the amount of reformed fuel from the amount of oxygen ($O_2$) in the reformed fuel (reformed gas).

Specifically, an oxygen concentration sensor is provided in the reformed fuel supply passage 51, and based on the output signal from the oxygen concentration sensor, the gas (gas containing reformed fuel) in the passages 51, 43 is evaluated. For example, based on output signals from the sensors 105, 106 provided in the reformed fuel supply passage 51 (output signals for calculating the amount of gas flowing through the reformed fuel supply passage 51) and output signals from the oxygen concentration sensor (output signal for calculating the oxygen concentration in the gas flowing in the reformed fuel supply passage 51), the amount of oxygen in the gas in the passages 51, 43 is evaluated.

When the amount of the reformed fuel is large, the oxygen amount is zero or small. Therefore, by evaluating the amount of oxygen, the residual amount of the reformed fuel in the passages 51, 43 can be estimated. For example, the relationship between the amount of oxygen and the residual amount of the reformed fuel in the passages 51, 43 is mapped on based on an experiment or a simulation, and this map is stored in the ROM. Then, by applying the amount of oxygen in this map, the amount of reformed fuel in the gas in the passages 51, 43 is evaluated. Then, when the amount of the reformed fuel is reduced to the predetermined amount, the internal combustion engine 1 is stopped.

Further, when the EGR gas amount adjusting valve 73 is opened and the EGR gas is introduced to the fuel reformation cylinder 2, this EGR gas amount needs to be subtracted for evaluating the amount of oxygen. This EGR gas amount is calculated based on the output signals from the sensors, the opening degree of the EGR gas amount adjusting valve 73, the opening degree of the bypass amount adjusting valve 75, and the like.

Alternatively, instead of the amount of oxygen, the amount of reformed fuel in the passages 51, 43 can be estimated similarly to the above, based on the amount of carbon dioxide ($CO_2$) in the reformed fuel (reformed gas).

(Third Estimation Method)

The third estimation method estimates the residual amount of the reformed fuel in the passages 51, 43 based on the temperature and pressure in the reformed fuel supply passage 51 and the output cylinder air-intake passage 43. This estimating operation corresponds to an operation of the present invention in which "the residual amount of reformed fuel in the reformed fuel supply path is estimated based on the temperature and pressure in the reformed fuel supply path". The estimating operation is executed by the ECU 100. Therefore, the functional part of the ECU 100 that executes this estimating operation corresponds to the residual amount estimator described in the present invention.

In this case, the residual amount of the reformed fuel can be calculated by the following formula (1) using a state equation of gas.

[Formula 1]

$$G_{rfm\_res} = \frac{P \cdot V}{R \cdot T} \quad (1)$$

In this formula (1), $G_{rfm\#res}$ is a residual amount of the reformed fuel, P is a pressure in the passages 51, 43, V is a volume of the passages 51, 43, R is a gas constant, and T is a temperature in the passages 51, 43.

The pressure P in the passages 51, 43 is calculated based on the output signal from the reformed gas pressure sensor 105. The volume V of the passages 51, 43 is unchanged and is determined beforehand (determined in the design stage of the internal combustion engine 1). The gas constant R is determined by the gas composition of the reformed fuel. The T of the passages 51, 43 is calculated based on the output signal from the reformed gas temperature sensor 106.

The passages 51, 43 are connected to the air-intake side of the output cylinder 3, and the air (fresh air) turbocharged by the compressor wheel 12a of the turbocharger 12 and the EGR gas introduced through the output cylinder EGR passage 76 are mixed and introduced into the output cylinder 3. Since the pressure P in the passages 51, 43 is influenced by the air and the EGR gas, it is preferable to calculate the residual amount $G_{rfm\#res}$ of the reformed fuel in consideration of the influence.

(Fourth Estimation Method)

The fourth estimation method compares an integrated value of the amount of reformed fuel generated from the start of the fuel reforming operation, with an integrated value of the amount of reformed fuel consumed (combusted) in the output cylinder 3. Then, when the difference is not more than a predetermined amount or zero, after the fuel supply to the fuel reformation chamber 23 is stopped, the internal combustion engine 1 is stopped.

The difference in the integrated values can be calculated according to the following formula (2).

[Formula 2]

$$G_{rfm\_res} = \int (\text{amount of reformed gas generated}) - \int (\text{amount of reformed gas consumed}) \quad (2)$$

This estimating operation using the formula (2) is the operation of the present invention which estimates "a residual amount of reformed fuel in the reformed fuel supply path by subtracting an integrated value of an amount of the reformed fuel combusted in the output cylinder, from an integrated value of an amount of the reformed fuel generated in the fuel reformation device from the start of the fuel reforming operation" The estimating operation is executed by the ECU 100. Therefore, the functional part of the ECU 100 that executes this estimating operation corresponds to the residual amount estimator described in the present invention.

The generated amount of the reformed gas in the formula (2) can be calculated by the following formula (3).

[Formula 3]

$$G_{rfm\_prod} = G_{in\_rfm} + G_{fuel\_rfm} \quad (3)$$

In this formula (3), $G_{rfm\#prod}$ is the amount of reformed gas generated, $G_{in\#rfm}$ is the amount of taken-in gas introduced to the fuel reformation cylinder 2, and $G_{fuel\#rfm}$ is the amount of fuel supplied to the fuel reformation cylinder 2.

The amount of taken-in gas $G_{in\#rfm}$ introduced to the fuel reformation cylinder 2 can be calculated based on the output signal from the intake-air flow sensor 101b. This amount of taken-in gas $G_{in\#rfm}$ can be also calculated based on the output signals from the taken-in gas pressure sensor 102 and the taken-in gas temperature sensor 103. The fuel amount $G_{fuel\#rfm}$ supplied to the fuel reformation cylinder 2 can be calculated from the injection command value for the injector 25.

The generated amount of the reformed gas in the formula (2) can be calculated by the following formula (4).

[Formula 4]

$$G_{rfm\_cons} = G_{in\_pow} - G_{in\_EGR} - G_{air\_pow} \quad (4)$$

In the formula (4), $G_{rfm\#cons}$ is the amount of reformed gas consumed, $G_{in\#pow}$ is the amount of taken-in gas introduced to the output cylinder 3, $G_{in\#EGR}$ is the EGR gas amount introduced to the output cylinder 3, and $G_{air\#pow}$ is the amount of fresh air introduced to the output cylinder 3.

The amount of taken-in gas $G_{in\#pow}$ introduced to the output cylinder 3 in the formula (4) can be calculated by the following formula (5).

[Formula 5]

$$G_{in\_pow} = C_1 \cdot N_e \cdot n_{pow} \cdot \frac{P_{in\_pow} \cdot V_{cyl}}{R \cdot T_{in\_pow}} \quad (5)$$

In the formula (5), Ne is an engine rotational speed, $n_{pow}$ is the number of output cylinders 3, $P_{in\#pow}$ is an intake-air pressure, $V_{cyl}$ is a piston displacement of the output cylinder 3, $T_{in\#pow}$ is a taken-in air temperature, and $C_1$ is a correction coefficient set in advance. The engine rotational speed Ne is calculated based on an output signal from the crank position sensor 108. The taken-in gas pressure $P_{in\#pow}$ is calculated based on the output signal from the reformed gas pressure sensor 105. The taken-in air temperature $T_{in\#pow}$ is calculated based on the output signal from the reformed gas temperature sensor 106. The number $n_{pow}$ of output cylinders 3 and the piston displacement $V_{cyl}$ of the output cylinder 3 are determined at the design stage of the internal combustion engine 1. The correction coefficient $C_1$ is set in advance based on an experiment or a simulation.

As shown in the formula (6), the EGR gas amount $G_{in\#EGR}$ of the formula (4) can be calculated from the difference between the exhaust pressure Pexh calculated based on the output signal from the exhaust pressure sensor 109 and the intake-air pressure $P_{in\#pow}$ of the output cylinder 3, the temperature $T_{EGR}$ of the EGR gas, and the opening degree $A_{EGR}$ of the EGR gas amount adjusting valve 78.

[Formula 6]

$$G_{in\_EGR} = C_2 \cdot A_{EGR} \cdot P_{exh} \cdot \sqrt{C_3 \cdot \frac{1}{T_{EGR}} \left( \frac{P_{in\_pow}^{2/\kappa}}{P_{exh}} - \frac{P_{in\_pow}^{1+1/\kappa}}{P_{exh}} \right)} \quad (6)$$

In the formula (6), κ is the polytropic number of the gas introduced to the combustion chamber 33. Further, $C_2$ and $C_3$ are correction coefficients set in advance. The polytropic number κ is 1.4 when the total amount of gas is the air. However, since the gas introduced to the combustion chamber 33 contains reformed fuel and EGR gas, the number varies depending on the gas composition. For example, if combusted gas ($CO_2$ or $H_2O$) or the reformed fuel is contained, the ratio of the 2-atom molecules decreases, and so does the polytropic number κ. The polytropic number κ can be evaluated based on an experiment or a simulation. Further, the correction coefficients $C_2$ and $C_3$ are set in advance based on an experiment or a simulation. The amount of fresh air $G_{air\#pow}$ in the above formula (4) is a value resulting from subtracting the amount of fresh air $G_{air\#rfm}$ consumed by the fuel reformation cylinder 2 from the total amount of fresh air taken into the internal combustion engine 1. This can therefore be obtained based on output signals from the intake-air flow sensors 101a, 101b arranged in two positions as described above.

(Fifth Estimation Method)

The fifth estimation method estimates the residual amount of the reformed fuel in the passages 51, 43, based on the fuel supply amount from the injector 35, during the reformed fuel processing operation (reformed fuel combustion process). This is specifically described hereinbelow.

When the reformed fuel processing operation is continued such that the fuel supply from the injector 25 to the fuel reformation chamber 23 is stopped while the fuel supply from the injector 35 to the combustion chamber 33 is continued, the residual amount of the reformed fuel in the passages 51, 43 is reduced, and the concentration of the reformed fuel in the gas introduced to the combustion chamber 33 is reduced. With this, the amount of fuel supplied to the combustion chamber 33 to continue driving the output cylinder 3 is increased. That is, by observing the fuel supply amount from the injector 35 to the combustion chamber 33, the residual amount of the reformed fuel in the passages 51, 43 can be estimated. When the fuel supply amount to the combustion chamber 33 reaches the predetermined amount, the residual amount of the reformed fuel in the passages 51, 43 is an amount that can allow stopping of the internal combustion engine 1. The internal combustion engine 1 is then stopped at this timing.

Figure 4:
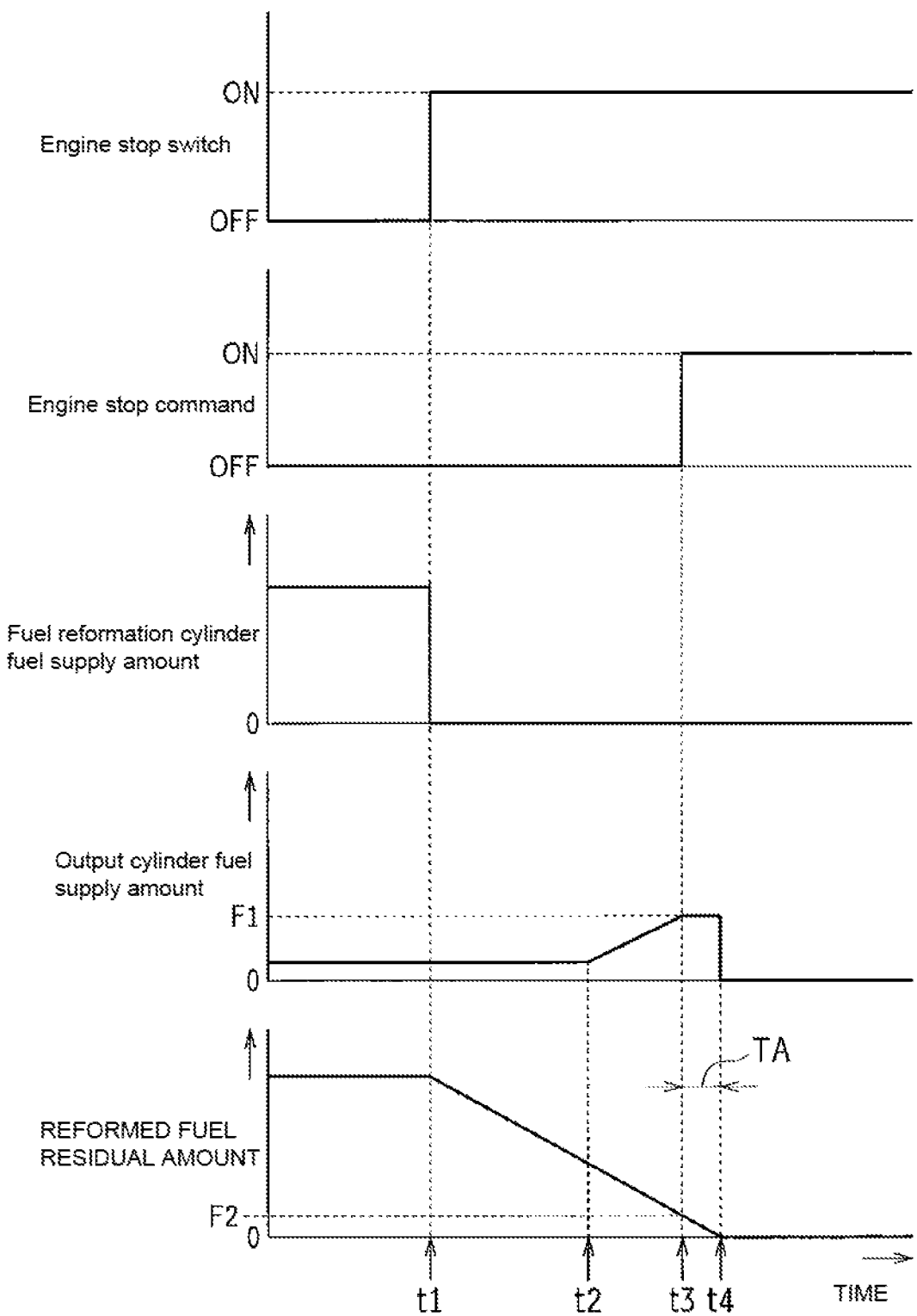
FIG. 4 A timing chart showing an example of changes in an engine stop switch signal, an engine stop command signal, a fuel supply amount to the fuel reformation cylinder, a fuel supply amount to the output cylinder, and a residual amount of the reformed fuel, when the internal combustion engine related to the first embodiment is stopped.

FIG. 4 is a timing chart showing an example of changes in an engine stop switch signal, an engine stop command signal, a fuel supply amount to the fuel reformation cylinder 2, a fuel supply amount to the output cylinder 3, and a residual amount of the reformed fuel, when the internal combustion engine 1.

In FIG. 4, the ECU 100 receives the engine stop command by an ON-operation of the engine stop switch 120 at the timing t1 in the drawing, and the fuel supply amount to the fuel reformation cylinder 2 is brought to zero. That is, the fuel supply from the injector 25 to the fuel reformation chamber 23 is stopped, so that reformed fuel is not generated. Along with this, the residual amount of the reformed fuel is gradually reduced from the timing t1. Further, a small amount of fuel is supplied from the injector 35 to the combustion chamber 33 for the diesel micro pilot ignition.

At the timing t2, the fuel supply amount from the injector 35 is increased, because the reformed fuel (reformed fuel remaining in the passages 51, 43) introduced to the combustion chamber 33 and the small amount of fuel from the injector 35 fall short for driving the output cylinder 3. The fuel supply amount from the injector 35 from and after the timing t2 (the period from the timing t2 to the timing t3) gradually increases with a decrease in the residual amount of the reformed fuel. For example, the fuel supply amount from the injector 35 is increased so that the engine rotational speed is maintained by control using a speed governor.

At timing t3, when the amount of fuel supplied from the injector 35 reaches the predetermined amount FIG. 1, the residual amount of the reformed fuel is determined as to have decreased to an amount FIG. 2 that allows stopping of the internal combustion engine 1. Then, the ECU 100 outputs an engine stop command, and sets the command value of the fuel supply amount for the injector 35 to zero. This way, the fuel is no longer supplied to the combustion chamber 33, and the internal combustion engine 1 is stopped.

The fuel supply amount threshold value FIG. 1 for outputting the engine stop command, and the threshold value FIG. 2 for the residual amount of the reformed fuel are determined in advance by an experiment or a simulation, and stored in the ROM as a map.

When the internal combustion engine 1 is to be stopped after reducing the residual amount of reformed fuel in the passages 51, 43 to zero, the drop rate of the reformed fuel in the passages 51, 43 while the reformed fuel processing operation is continued is determined beforehand. Then, a period (time TA in FIG. 4) required for the amount of the reformed fuel in the passages 51, 43 to reach zero after the fuel supply amount from the injector 35 reaches the predetermined amount FIG. 1 is evaluated from the drop rate, and stopping of the internal combustion engine 1 is waited for that period required.

When this estimation method is adopted, the end timing of the reformed fuel processing operation can be suitably determined by observing the fuel supply amount from the injector 35 to the combustion chamber 33, and the control can be simplified.

In the present embodiment, the residual amount of the reformed fuel in the passages 51, 43 is estimated by the above described estimation methods. When the estimated amount reaches a predetermined amount, or when the estimated amount reaches zero, the fuel supply from the injector 35 to the combustion chamber 33 is stopped to stop the internal combustion engine 1. In other words, when the ECU 100 receives an engine stop command by ON-operation of the engine stop switch 120, the residual amount of the reformed fuel in the passages 51, 43 is estimated by any of the above-described estimation methods, and the operation in the output cylinder 3 is continued until the estimated amount reaches a predetermined amount to continue consumption of the reformed fuel in the passages 51, 43. Then, when the residual amount of the reformed fuel in the passages 51, 43 reaches a predetermined amount or when the estimated amount reaches zero, the driving of the output cylinder 3 is stopped. This way, the internal combustion engine 1 is stopped. Further, while the operation of the output cylinder 3 is continued, an alarm may be indicated on the operator screen of the system or an alarm sound may be output by the alarm device 130.

As described above, according to the present embodiment, the reformed fuel does not remain in the passages 51, 43, or the residual amount of the reformed fuel in the passages 51, 43 is significantly reduced. This keeps the reformed fuel from being discharged into the atmosphere from the system at an unintended timing. Further, the gas composition in the output cylinder at a subsequent early start-up stage of the internal combustion engine 1 is suppressed or reduced from being greatly deviated from a suitable state.

Second Embodiment (Reformed Fuel Discharging Operation)

Next, the following describes a case where the reformed fuel discharging operation is executed. After the emergency stop switch 121 is ON-operated due to an emergency in the system, or after the ECU 100 executes an automatic emergency stop, to forcibly stop the internal combustion engine 1, the reformed fuel discharging operation discharges the reformed fuel in the reformed fuel supply passage 51 and the output cylinder air-intake passage 43 into the atmosphere through the output cylinder bypass passage 81, the output cylinder EGR passage 76, the exhaust passage 61, and the oxidation catalyst 300, and executes an alarm operation by the alarm device 130.

Figure 5:
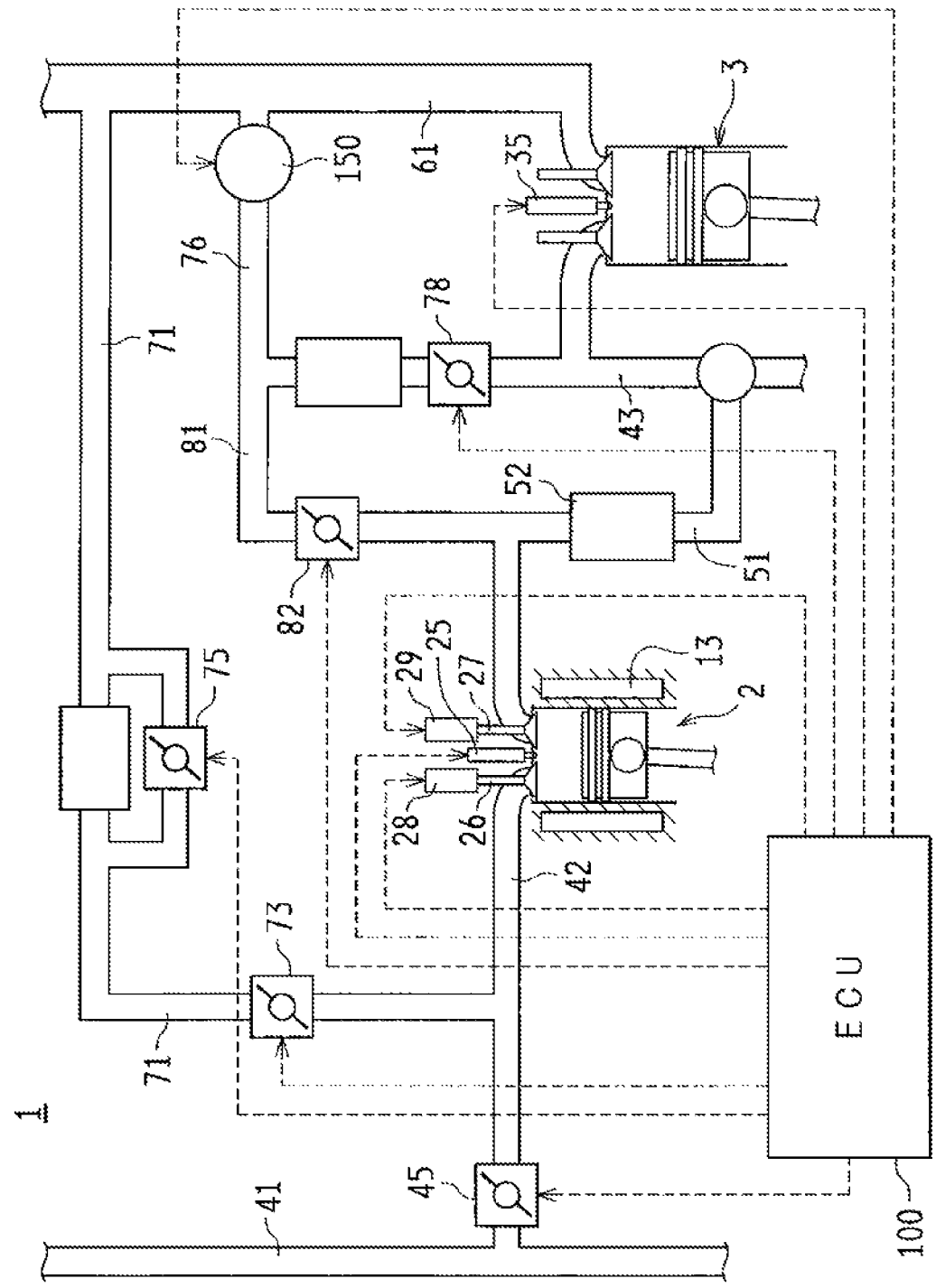
FIG. 5 A diagram showing a schematic structure of a part of an internal combustion engine related to a second embodiment.

FIG. 5 is a diagram showing a schematic structure of a part of the internal combustion engine 1 that executes the reformed fuel discharging operation. As shown in FIG. 5, the internal combustion engine 1 according to the present embodiment includes, in the output cylinder EGR passage 76, a blower (discharge unit of the present invention) 150. The blower 150 is configured to mix the reformed gas remaining in the system with the fresh air, and supply the mixed air to the oxidation catalyst 300 arranged in the exhaust passage 61, and is activated in response to an activation command signal from the ECU 100.

In the reformed fuel discharging operation, the ECU 100 opens (fully opens) both the EGR gas amount adjusting valve 78 and the bypass amount adjusting valve 82, and the blower 150 is activated. The reformed fuel remaining in the reformed fuel supply passage 51 is mixed with the fresh air supplied by the blower 150, and flows to the oxidation catalyst 300 through the output cylinder bypass passage 81, the output cylinder EGR passage 76, the exhaust passage 61. When the gas temperature is a predetermined temperature or higher, the fuel is converted into carbon dioxide and water through an oxidation reaction in the oxidation catalyst 300, and then discharged to the atmosphere. Further, the reformed fuel remaining in the output cylinder air-intake passage 43 is discharged to the atmosphere through the output cylinder EGR passage 76 and the exhaust passage 61 in the similar manner.

Since the reformed fuel remaining in the reformed fuel supply passage 51 and the output cylinder air-intake passage 43 is forcibly discharged to the atmosphere by the blower 150 as described above, the reformed fuel remaining in the reformed fuel supply passage 51 and the output cylinder air-intake passage 43 can be discharged in a short period of time. Therefore, the time required for the reformed fuel processing operation (reformed fuel discharging operation) can be shortened. Further, the hydrogen, the carbon monoxide, methane, and the like which are the main components of the reformed gas can be oxidized, removed, and detoxified by the oxidation catalyst 300. In this reformed fuel discharging operation, an alarm operation by the alarm device 130 is performed. Therefore, it is possible to warn the worker and the like around the internal combustion engine 1. Therefore, the reformed fuel is kept from being discharged from the system into the atmosphere at an unintended timing.

The bypass amount adjusting valve 82 is closed during the fuel reforming operation and opened during the reformed fuel discharging operation. With this, a situation where the reformed fuel is partially discharged through the output cylinder bypass passage 81 and the output cylinder EGR passage 76, without being supplied to the output cylinder 3 can be avoided during the fuel reforming operation, and the fuel consumption rate can be improved.

Modification

The following describes a modification of the second embodiment. This modification is a modification of the internal combustion engine 1 configured to execute the reformed fuel discharging operation.

Figure 6:
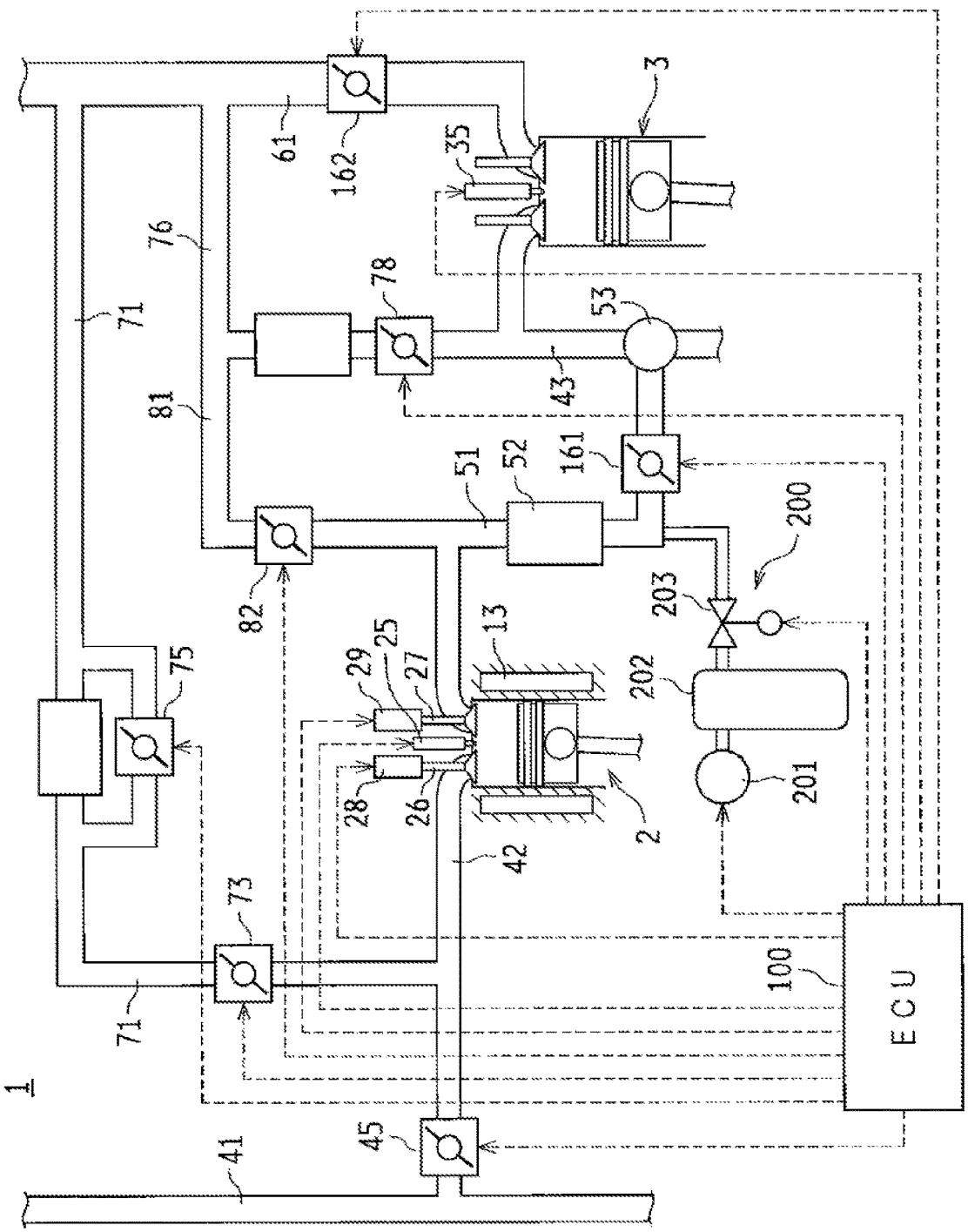
FIG. 6 A diagram showing a schematic structure of a part of an internal combustion engine related to a modification of the second embodiment.

FIG. 6 is a diagram showing a schematic structure of a part of an internal combustion engine 1 related to the modification. As shown in FIG. 6, the internal combustion engine 1 according to the present modification has closing valves 161, 162 capable of being closed/opened between the reformed fuel cooler 52 and the mixer 53 in the reformed fuel supply passage 51, and in the exhaust passage 61 on the upstream side of the portion communicating with the output cylinder EGR passage 76. The closing valves 161, 162 can be closed by a closing command signal from the ECU 100.

Between the reformed fuel cooler 52 and the closing valve 161 in the reformed fuel supply passage 51, a pressure-feed unit (discharge unit of the present invention) 200 is connected. The pressure-feed unit 200 is connected to a compressor 201, an accumulator tank 202, and an open/close valve 203 through piping. In this structure, when the compressor 201 is operated with the open/close valve 203 closed, gas (air) is accumulated in the accumulator tank 202. When the open/close valve 203 is opened during this state, the gas in the accumulator tank 202 is pressure-fed toward the reformed fuel supply passage 51.

In the reformed fuel discharging operation of the present modification, the ECU 100 opens (fully opens) both the EGR gas amount adjusting valve 78 and the bypass amount adjusting valve 82. Further, the closing valve 162 is closed and the open/close valve 203 of the pressure-feed unit 200 is opened while the gas is accumulated in the accumulator tank 202 by the operation of the compressor 201. This pressure-feed the gas in the accumulator tank 202 towards the reformed fuel supply passage 51, and the reformed fuel remaining in the reformed fuel supply passage 51 is discharged to the atmosphere through the output cylinder bypass passage 81, the output cylinder EGR passage 76, and the exhaust passage 61 (pushed out by the gas from the accumulator tank 202). Further, the reformed fuel remaining in the output cylinder air-intake passage 43 is discharged to the atmosphere through the output cylinder EGR passage 76 and the exhaust passage 61 (pushed out by the gas from the accumulator tank 202).

Also in the present modification, since the reformed fuel remaining in the reformed fuel supply passage 51 and the output cylinder air-intake passage 43 is forcibly discharged to the exhaust path, the reformed fuel remaining in the reformed fuel supply passage 51 and the output cylinder air-intake passage 43 can be discharged in a short period of time. Therefore, the time required for the reformed fuel processing operation (reformed fuel discharging operation) can be shortened.

Also in this reformed fuel discharging operation, an alarm operation by the alarm device 130 is performed. Therefore, it is possible to warn the worker and the like around the internal combustion engine 1. Therefore, the reformed fuel is kept from being discharged from the system into the atmosphere at an unintended timing.

In the reformed fuel discharging operation of the present modification, the closing valves 161, 162 may be closed.

Other Embodiments

Note that the above embodiments and modifications are illustrative in all respects, and is not intended to be a basis for limiting interpretation. Accordingly, the scope of the present invention is not to be interpreted solely by the foregoing embodiments and modifications, but is defined based on the description of the appended claims. Further, the technical scope of the present invention includes all changes within the meaning and scope of the appended claims.

For example, the above embodiments and modifications deal with a case where the present invention is applied to an internal combustion engine 1 for a ship, but the present invention is also applicable to an internal combustion engine in other applications (e.g., an electric power generator, a vehicle, and the like).

Further, the above embodiments and modifications deal with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment and modifications deal with a case where the fuel to be supplied to the fuel reformation chamber 23 is light oil. The present invention is not limited to this, and the fuel may be heavy oil, gasoline, or the like.

Further, the above embodiments and modifications deal with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

Further, the above embodiments and modifications deal with a case where the engine power obtained from the output cylinder 3 is partially used as a drive source for reciprocation of the piston 22 in the fuel reformation cylinder 2. The present invention is not limited to this, and the drive source for the fuel reformation cylinder 2 may be provided separately. For example, the fuel reformation cylinder 2 and the output cylinder 3 may be separately arranged (arranged without being connected by the crankshaft 11), and the piston 22 of the fuel reformation cylinder 2 may be reciprocated by an electric motor or the like.

The above embodiments and modifications deal with a case where the present invention is applied to an internal combustion engine 1 configured to generate reformed fuel in its fuel reformation cylinder 2. However, application of the present invention is not limited to this, and the present invention may be applied to an internal combustion engine configured to generate reformed fuel by using a fuel reforming catalyst. In this case, for example, the equivalence ratio inside the fuel reforming catalyst is set to be slightly higher than "1", and the reformed fuel is generated by warming the fuel reforming catalyst using the quantity of heat from the exhaust gas, and this reformed fuel is supplied to the output cylinder 3. In this case, when the internal combustion engine 1 is stopped, the fuel reforming operation by the fuel reforming catalyst is not executed (fuel supply to the inside of the fuel reforming catalyst is stopped).

Further, in each of the above embodiments and modification, the timing for injecting a small amount of fuel (ignition timing controlling fuel) from the injector 35 into the combustion chamber 33 is defined as the time point when the piston 32 reaches the compression top dead point. The present invention however is not limited to this, and a small amount of fuel may be injected from the injector 35 at an advanced angle side, or may be injected from the injector 35 at a retarded angle side, from the time point when the piston 32 reaches the compression top dead point.

In the second embodiment and its modification, the reformed fuel in the passages 51, 43 is forcibly discharged using the blower 150 or the pressure-feed unit 200. The present invention is not limited to this, and the blower 150 and the pressure-feed unit 200 do not have to be provided.

After the internal combustion engine 1 is forcibly stopped, the reformed fuel in the passages 51, 43 may be discharged to the atmosphere by opening both the EGR gas amount adjusting valve 78 and the bypass amount adjusting valve 82. As described above, in the present invention, the oxidation catalyst 300 is not essential. Therefore, the oxidation catalyst 300 may be disposed in the exhaust passage 61, or the oxidation catalyst 300 may be omitted in this structure.

It should be noted that the present invention may be embodied in various other forms without departing from the spirit or essential characteristics thereof. Therefore, each of the embodiments described above and each of the embodiments described above are merely exemplary, and should not be construed as limiting the scope of the present invention. The scope of the present invention is indicated by the appended claims and is not to be limited in any way by the text of the specification. Further, the scope of the present invention encompasses all changes and modifications falling within the scope of the appended claims.

This application claims priority from Japanese Patent Application No. 2016-139577, filed in Japan on Jul. 14, 2016. The entire content of the application is hereby incorporated in the present application by reference. The entire contents of the documents cited herein are hereby incorporated in the present application by reference.

INDUSTRIAL APPLICABILITY

The present invention is applicable to control of an internal combustion engine including a fuel reformation cylinder and an output cylinder.

REFERENCE SIGNS LIST

1 internal combustion engine
2 fuel reformation cylinder (fuel reformation device)
21 cylinder bore
22 piston
3 output cylinder
43 output cylinder air-intake passage
51 reformed fuel supply passage (reformed fuel supply path)
61 exhaust passage (exhaust path)
76 output cylinder EGR passage
81 output cylinder bypass passage (exhaust path)
82 bypass amount adjusting valve (open/close valve)
100 ECU
104 reformed gas concentration sensor
105 reformed gas pressure sensor
106 reformed gas temperature sensor
120 engine stop switch
121 emergency stop switch
130 alarm device (alarm unit)
300 oxidation catalyst

The invention claimed is:

1. A control device for an internal combustion engine including a fuel reformation device capable of generating reformed fuel through a fuel reforming operation and an output cylinder to which the reformed fuel generated in the fuel reformation device is supplied through a reformed fuel supply path, the output cylinder being configured to yield an engine power by combusting the reformed fuel, the control device comprising:
a reformed fuel processing unit configured to:
execute a reformed fuel processing operation, upon receiving an engine stop command or after the internal combustion engine is stopped, for drawing out and processing the reformed fuel from the reformed fuel supply path until a residual amount of reformed fuel in the reformed fuel supply path is a predetermined amount or less; and
initiate, based on receiving the engine stop command, introduction of the reformed fuel in the reformed fuel supply path into the output cylinder and combustion of the reformed fuel in the output cylinder.

2. The control device according to claim 1, wherein:
an exhaust path is provided in which the reformed fuel in the reformed fuel supply path flows while bypassing the output cylinder, an oxidation catalyst is provided in the exhaust path, and an alarm unit configured to issue an alarm is provided; and
the reformed fuel processing operation introduces the reformed fuel in the reformed fuel supply path into the exhaust path after the internal combustion engine is stopped, and when a gas temperature thereof is equal to or higher than a predetermined temperature, the reformed fuel is oxidized and detoxified by the oxidation catalyst and then discharged into atmosphere, and an alarm is issued by the alarm unit.

3. The control device according to claim 1, further comprising
a residual amount estimator configured to estimate a residual amount of the reformed fuel in the reformed fuel supply path, based on concentration of a reformed fuel component in the reformed fuel supply path or based on temperature and pressure in the reformed fuel supply path,
wherein the reformed fuel processing unit is configured to execute the reformed fuel processing operation until the residual amount of the reformed fuel estimated by the residual amount estimator becomes equal to or less than a predetermined amount.

4. The control device according to claim 1, further comprising
a residual amount estimator configured to estimate a residual amount of reformed fuel in the reformed fuel supply path by subtracting an integrated value of an amount of the reformed fuel combusted in the output cylinder, from an integrated value of an amount of the reformed fuel generated in the fuel reformation device from a start of the fuel reforming operation,
wherein the reformed fuel processing unit is configured to execute the reformed fuel processing operation until the residual amount of the reformed fuel estimated by the residual amount estimator becomes equal to or less than a predetermined amount.

5. The control device according to claim 1, wherein:
the fuel reformation device is structured by a reciprocation type fuel reformation cylinder in which a piston reciprocates in the reciprocation type fuel reformation cylinder, and
when the engine stop command is received, the reformed fuel processing unit executes the reformed fuel processing operation to stop a fuel supply to the fuel reformation cylinder, and continue the fuel supply to the output cylinder to continue driving of the output cylinder, and
the reformed fuel processing operation is executed until a fuel supply amount to the output cylinder for continuing driving of the output cylinder reaches a predetermined amount.

6. The control device according to claim 2, wherein:
the exhaust path is provided with an open/close valve capable of being opened/closed, and the open/close valve is closed in the fuel reforming operation and opened in the reformed fuel processing operation.

7. The control device according to claim 2, wherein:
the exhaust path is provided with an exhaust unit configured to cause the reformed fuel in the reformed fuel supply path to bypass the output cylinder and forcedly exhaust the reformed fuel into atmosphere through the oxidation catalyst.

8. A control method for an internal combustion engine including a fuel reformation device for generating reformed fuel through a fuel reforming operation and an output cylinder to which the reformed fuel generated in the fuel reformation device is supplied through a reformed fuel supply path, the output cylinder being configured to yield an engine power by combusting the reformed fuel, the control method comprising:
executing a reformed fuel processing operation based on receiving an engine stop command or detecting the internal combustion engine is in a stopped state, the reformed fuel processing operation comprising:
drawing out the reformed fuel from the reformed fuel supply path until a residual amount of reformed fuel in the reformed fuel supply path becomes a predetermined amount or less; and
processing the reformed fuel drawn out from the reformed fuel supply path; and
stopping the reformed fuel processing operation based on a determination that the residual amount of reformed fuel in the reformed fuel supply path is less than or equal to the predetermined amount.

9. The control method according to claim 8, further comprising:
receiving the engine stop command;
determining the residual amount of reformed fuel in the reformed fuel supply path; and
comparing the residual amount of reformed fuel in the reformed fuel supply path to the predetermined amount.

10. The control method according to claim 8, further comprising, based on executing the reformed fuel processing operation:
stopping fuel injection from a first injector into the fuel reformation device;
injecting fuel into the output cylinder from a second injector when the residual amount of reformed fuel in the reformed fuel supply path is greater than the predetermined amount; and
stopping fuel injection into the output cylinder from the second injector when the residual amount of reformed fuel in the reformed fuel supply path is less than or equal to the predetermined amount.

11. The control method according to claim 8, wherein the reformed fuel processing operation is executed by an engine control unit.

12. The control method according to claim 11, wherein the engine control unit comprises a memory and a processor.

13. An apparatus comprising:
a control device configured to:
initiate, based on receipt of an engine stop command or detection of an engine being in a stopped state, a reformed fuel process configured to remove a reformed fuel from a reformed fuel supply path between a fuel reformation device and a cylinder;
perform a comparison between an amount of reformed fuel within the reformed fuel supply path to a threshold; and
based on a determination that an amount of reformed fuel within the reformed fuel supply path is less than or equal to the threshold, initiate stoppage of the reformed fuel process.

14. The apparatus according to claim 13, wherein the control device comprises an engine control unit.

15. The apparatus according to claim 14, wherein the engine control unit comprises a memory and a processor.

16. The apparatus according to claim 13, wherein the control device is configured to:
receive the engine stop command from an engine stop switch;
identify the amount of reformed fuel within the reformed fuel supply path; and
determine, based on the comparison, that the amount of reformed fuel within the reformed fuel supply path is less than or equal to the threshold.

17. The apparatus according to claim 13, further comprising:
a first injector configured to inject fuel into the fuel reformation device; and
a second injector configured to inject fuel into the cylinder.

18. The apparatus according to claim 17, wherein to initiate the reformed fuel process, the control device is configured to:
send a first signal to the first injector to stop fuel injection into the fuel reformation device, and
send a second signal to the second injector to inject fuel into the cylinder when the amount of reformed fuel within the reformed fuel supply is greater than the threshold.

19. The apparatus according to claim 18, wherein to initiate stoppage of the reformed fuel process, the control device is configured to send a third signal to the second injector to stop fuel injection into the cylinder.

* * * * *